(12) United States Patent
Vanderwall et al.

(10) Patent No.: US 7,609,173 B2
(45) Date of Patent: Oct. 27, 2009

(54) AUDIO-VISUAL POINT-OF-SALE PRESENTATION SYSTEM AND METHOD DIRECTED TOWARD VEHICLE OCCUPANT

(75) Inventors: Mark T. Vanderwall, Alto, MI (US); Lena Epstein, Ann Arbor, MI (US); Lillian Epstein, Birmingham, MI (US)

(73) Assignee: Vesco Oil Corporation, Southfield, MI (US)

( * ) Notice: Subject to any disclaimer, the term of this patent is extended or adjusted under 35 U.S.C. 154(b) by 324 days.

(21) Appl. No.: 11/555,360

(22) Filed: Nov. 1, 2006

(65) Prior Publication Data

US 2007/0116299 A1    May 24, 2007

Related U.S. Application Data

(60) Provisional application No. 60/732,105, filed on Nov. 1, 2005, provisional application No. 60/819,784, filed on Jul. 10, 2006.

(51) Int. Cl.
G08G 1/00 (2006.01)
H04H 40/00 (2008.01)
H05K 11/02 (2006.01)
H04B 1/18 (2006.01)

(52) U.S. Cl. ............. 340/901; 455/3.06; 455/345; 455/152.1

(58) Field of Classification Search ........... 340/438, 340/901, 905, 539.25; 455/424, 152.1, 345, 455/3.06, 74, 575.9, 93; 307/10.1, 9.1; D20/35; 705/16–27

See application file for complete search history.

(56) References Cited

U.S. PATENT DOCUMENTS

| 4,047,109 A | * | 9/1977 | Sekiguchi | 455/3.06 |
|---|---|---|---|---|
| 5,053,868 A | * | 10/1991 | Higgins et al. | 348/150 |
| 5,081,707 A | | 1/1992 | Schorman et al. | |
| 5,192,247 A | * | 3/1993 | Barr et al. | 472/60 |
| 5,418,577 A | | 5/1995 | Bagley | |
| 5,864,627 A | | 1/1999 | Kim | |
| 6,295,448 B1 | | 9/2001 | Hayes, Jr. et al. | |
| 6,411,220 B1 | * | 6/2002 | Davis et al. | 340/905 |
| 6,571,168 B1 | * | 5/2003 | Murphy et al. | 701/123 |

(Continued)

*Primary Examiner*—Jennifer Mehmood
(74) *Attorney, Agent, or Firm*—Gifford, Krass, Sprinkle, Anderson & Citkowski, P.C.

(57) ABSTRACT

An audio-visual presentation system delivering a presentation to a vehicle passenger compartment is provided that includes a video display mounted external to a vehicle passenger compartment and viewable from within the compartment. A controller provides a video signal to the display and an audio signal. The audio signal is broadcast by an antenna coupled to the controller as a radio frequency is received by a vehicle radio and discernable to a vehicle sound system. The audio-visual presentation system is particularly well suited as a method of education and sale regarding vehicle service products. Rather than providing a discernable audio signal through a vehicle sound system, it is appreciated that a portable radio set is readily placed within a vehicle passenger compartment or the audio signal delivered via a wireless network. A still further advantage is realized by providing a technician servicing the vehicle with a microphone operative to interrupt the audio signal of the presentation so as to convey vehicle service information regardless of whether the presentation is viewed within the vehicle compartment or in a remote waiting room. The audio-visual presentation is readily tailored to the past viewing and/or purchase history of a potential customer.

23 Claims, 5 Drawing Sheets

U.S. PATENT DOCUMENTS

| | | |
|---|---|---|
| 6,614,913 B1 | 9/2003 | Allen |
| 6,754,485 B1 | 6/2004 | Obradovich et al. |
| 6,754,570 B2 * | 6/2004 | Iihoshi et al. .................. 701/33 |
| 6,836,667 B1 | 12/2004 | Smith, Jr. |
| 7,006,164 B1 * | 2/2006 | Morris ....................... 348/836 |
| 7,142,844 B2 | 11/2006 | Obradovich et al. |
| 7,266,927 B2 * | 9/2007 | Higgs .......................... 52/175 |
| 7,406,294 B1 * | 7/2008 | Liu .......................... 455/3.06 |
| 2001/0032165 A1 * | 10/2001 | Friend et al. .................. 705/37 |
| 2002/0147648 A1 * | 10/2002 | Fadden et al. ................. 705/16 |
| 2002/0164999 A1 | 11/2002 | Johnson |
| 2002/0175830 A1 * | 11/2002 | Hudson ....................... 340/907 |
| 2003/0208579 A1 * | 11/2003 | Brady et al. ................. 709/223 |
| 2003/0224783 A1 * | 12/2003 | Ruddell .................... 455/426.2 |
| 2004/0023666 A1 | 2/2004 | Moon et al. |
| 2004/0048622 A1 | 3/2004 | Witkowski et al. |
| 2004/0075847 A1 * | 4/2004 | McCracken ................. 356/622 |
| 2004/0162064 A1 | 8/2004 | Himmelstein |
| 2004/0222302 A1 * | 11/2004 | Matsumori ............. 235/472.01 |
| 2007/0022447 A1 | 1/2007 | Arseneau et al. |

* cited by examiner

AUDIO-VISUAL POINT-OF-SALE PRESENTATION SYSTEM AND METHOD DIRECTED TOWARD VEHICLE OCCUPANT

CROSS-REFERENCE TO RELATED APPLICATIONS

This application claims priority of U.S. Provisional Patent Applications Ser. No. 60/732,105 filed Nov. 1, 2005 and Ser. No. 60/819,784 filed Jul. 10, 2006, which are incorporated herein by reference.

FIELD OF THE INVENTION

The present invention in general relates to a point-of-sale method and system, in particular to a point-of-sale method aimed at a vehicle occupant through external visual display in conjunction with an audio portion communicated via a vehicle radio.

BACKGROUND OF THE INVENTION

While it was once required that a vehicle oil change entailed placing a vehicle in the custody of a mechanic and either leaving the vehicle for later pickup or remaining in a garage waiting room until the oil change was completed, rapid service oil change establishments have greatly streamlined the oil change process. As currently practiced, a rapid oil change establishment provides a bay into which a driver maneuvers a vehicle. Rather than hoist the vehicle and thereby require vehicle occupants to exit, a rapid oil change establishment has a staircase-accessible dugout underneath the vehicle bay from which a technician has access to the vehicle oil pan and undercarriage. As a result, an oil change is readily performed in a matter of from five to fifteen minutes. Unfortunately, total time associated with a quick oil change is considerably longer owing to the need for a technician to explain various oil grade options and the relative merits of various ancillary maintenance products and services. An additional problem associated with car owner education about various oil change options and services is the turnover rate of technicians who are themselves well versed in the performance benefits of the various product and service options.

Similar consumer education and sales problems are also encountered in drive-through sales settings such as car-washes, parking lots, food and beverage serving establishments, liquor stores, banks, pharmacies, and dry cleaners. The common features of these sales settings are that consumer education and sales requires considerable service-provider education and often a delay in service provision.

Thus, there exists a need for a sales system delivering information to a vehicle occupant through an automated audio-visual system. Delivery of point-of-sales advertising to a vehicle occupant in such a manner overcomes the prior art limitations of continuing employee education, customer education, and service delays associated with providing such a presentation.

SUMMARY OF THE INVENTION

An audio-visual presentation system delivering a presentation to a vehicle passenger compartment is provided that includes a video display mounted external to a vehicle passenger compartment and viewable from within the compartment. A controller provides a video signal to the display and an audio signal. The audio signal is broadcast by an antenna coupled to the controller as a radio frequency is received by a vehicle radio and discernable to a vehicle sound system. The audio-visual presentation system is particularly well suited as a method of education and sale regarding vehicle service products. Rather than providing a discernable audio signal through a vehicle sound system, it is appreciated that a portable radio set is readily placed within a vehicle passenger compartment or the audio signal delivered via a wireless network. A still further advantage is realized by providing a technician servicing the vehicle with a microphone operative to interrupt the audio signal of the presentation so as to convey vehicle service information regardless of whether the presentation is viewed within the vehicle compartment or in a remote waiting room. The audio-visual presentation is readily tailored to the past viewing and/or purchase history of a potential customer.

A kiosk is also provided that delivers an audio-visual presentation in response to a product scan within a business establishment showroom, sales floor, or waiting room. The audio-visual presentation provides educational, usage or specification information. Information regarding the product or the presentation is available for transmission to a customer-designated email address.

DETAILED DESCRIPTION OF THE PREFERRED EMBODIMENTS

The present invention has utility in providing a point-of-sales method associated with services delivered to an occupant of a vehicle or a subject waiting remote from a vehicle maintenance event. Through a visual display external to the vehicle synchronized with an audio portion broadcast optionally to a vehicle passenger compartment occupant, sales, education, or pure entertainment content is provided to a vehicle passenger compartment occupant. In a particular embodiment, a vehicle occupant is prompted to tune the vehicle radio to a particular frequency and the vehicle's occupant selects a presentation of interest to them. The vehicle occupant would then observe a visual presentation provided on the screen while receiving a synchronized audio portion of the presentation via vehicle speakers. The present invention allows a vehicle occupant to receive point-of-sales information independent of the need for a service technician or service provider to delay the provision of service or be knowledgeable about the various purchase options available to the vehicle occupant.

Figure 1:
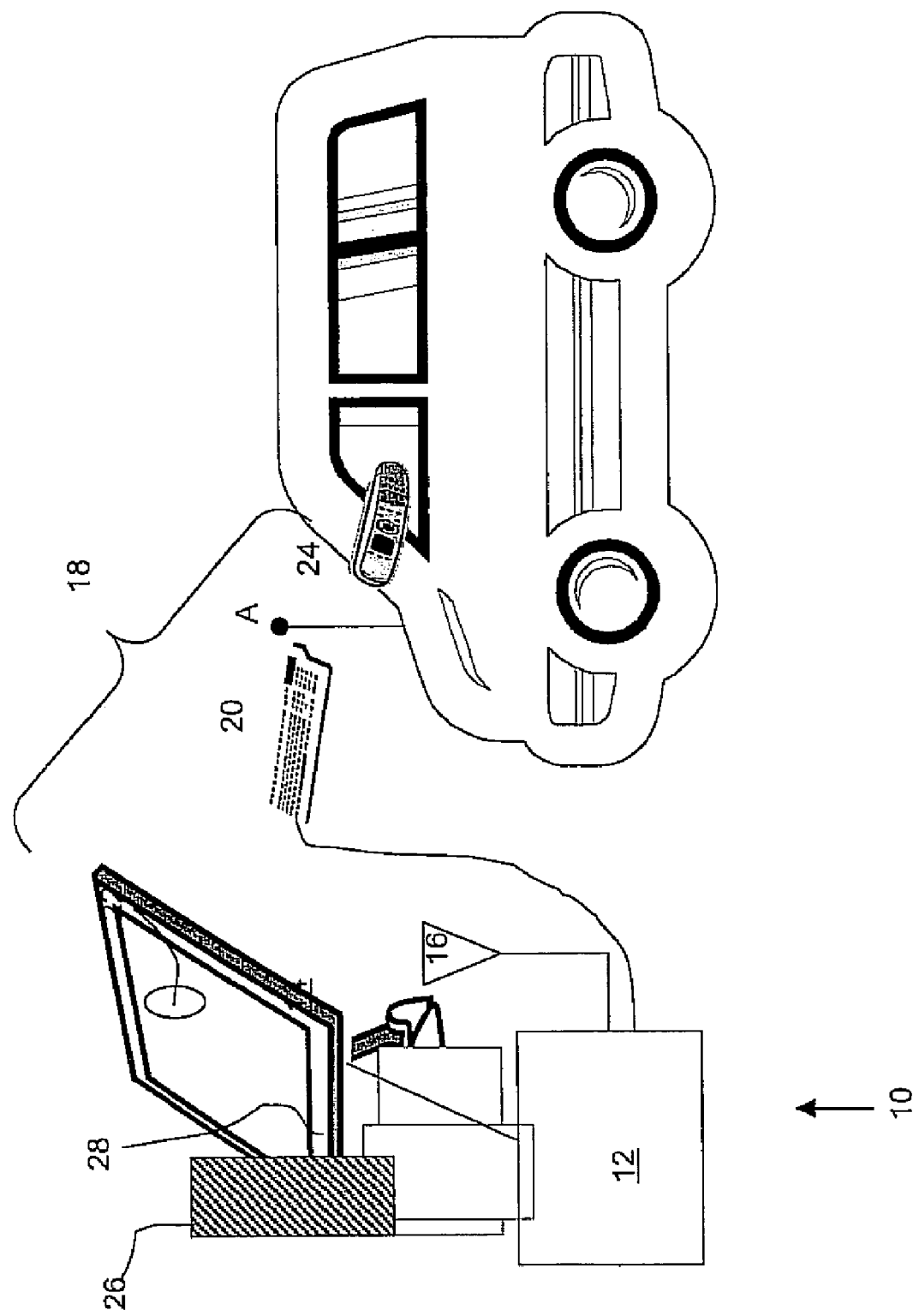
FIG. 1 is a schematic illustration of the components of an inventive audio-visual system.

Referring now to FIG. 1, system components for practice of an inventive point-of-sale method are shown generally at 10. The system 10 includes a controller 12 operating a visual display 14 and a radio frequency antenna 16. Optionally, a user interface 18 is provided to allow a vehicle occupant control over the presentation provided by way of the visual display 14 and the audio portion via radio frequency broadcast antenna 16. The user interface 18 is illustratively a keypad 20, a touch screen 22 incorporated into the display 14, or an infrared signal remote control 24 as is conventional to operate a television. Each of these user interfaces 18 is shown in FIG. 1, even though it is appreciated that an actual system 10 typically does not incorporate all three types of interface. The controller 12 activates a presentation directed at a vehicle occupant in any one of a number of play modes. Illustrative play modes for a controller 12 illustratively include continuous loop, start and stop, and play mode selected through a user interface 18. While presentation material is provided in a variety of formats illustratively including analog VHS tape and digital formats such as MPEG, MPEG2, HTML, XHTML, CSS, JavaScript, DHTML, XML, DOM, XSLT, ASP, ADO, SQL and AVI, in a preferred embodiment, inventive system 10 delivers a presentation from digital media. While an establishment having a single or a handful of systems practicing the point-of-sale method according to the present invention are well suited for the use of physically removable digital media such as a DVD or memory stick, establishments with a small number of systems having rapidly changing content, or a large number of systems is better suited to presentation storage, presentation modification, or a combination thereof by way of a network connection. The network connection is via an intranet or Internet with the communication within the network being either through a hardwired connection or wireless connection, such as via a satellite link. The controller 12 provides a video signal to the display 14. The video display 14 is of a type conventional to the art and illustratively includes a cathode ray tube, liquid crystal display, or plasma-type display. The display 14 is mounted to a substrate illustratively including an establishment wall, ceiling, utility pole, structural pillar, or other structural member; or provided on a pedestal 26 such that a vehicle occupant can view the display 14 either through the windshield or a window. Optionally, a display 14 is mounted on an arm 28 that is capable of swinging and/or telescoping to bring the display 14 into a convenient orientation relative to a vehicle passenger compartment.

The controller 12 feeds an audio signal associated with the visual portion of the presentation provided on the display 14 to a radio frequency antenna 16. The radio antenna 16, while operative in either radio frequency modulation mode of amplitude modulation (AM) or frequency modulation (FM) transmission modes, is preferably operative in amplitude modulation mode. As an antenna of a system 10 is typically located local to a vehicle radio reception antenna A, such as within tens or hundreds of meters, broadcast power by an inventive system 10 can have almost any power able to reach antenna A and typically ranges from 0.5 to 50 watts to lessen FCC regulatory requirements.

In a preferred embodiment a technician servicing the vehicle is provided with a microphone 19 preferably mounted in a headset 21 operative to interrupt the audio portion of the presentation. A vehicle occupant is able to respond to technician communications verbally, or via user interface 18, or via a remote control 24, or through a microphone 29 provided to the vehicle occupant for such a purpose. In the instance where the vehicle occupant has a microphone 29, the technician is equipped with a complementary speaker 31 in the headset. In this way, service is expedited in concert with a vehicle occupant receiving a presentation relevant to vehicle service products and services.

Figure 2:
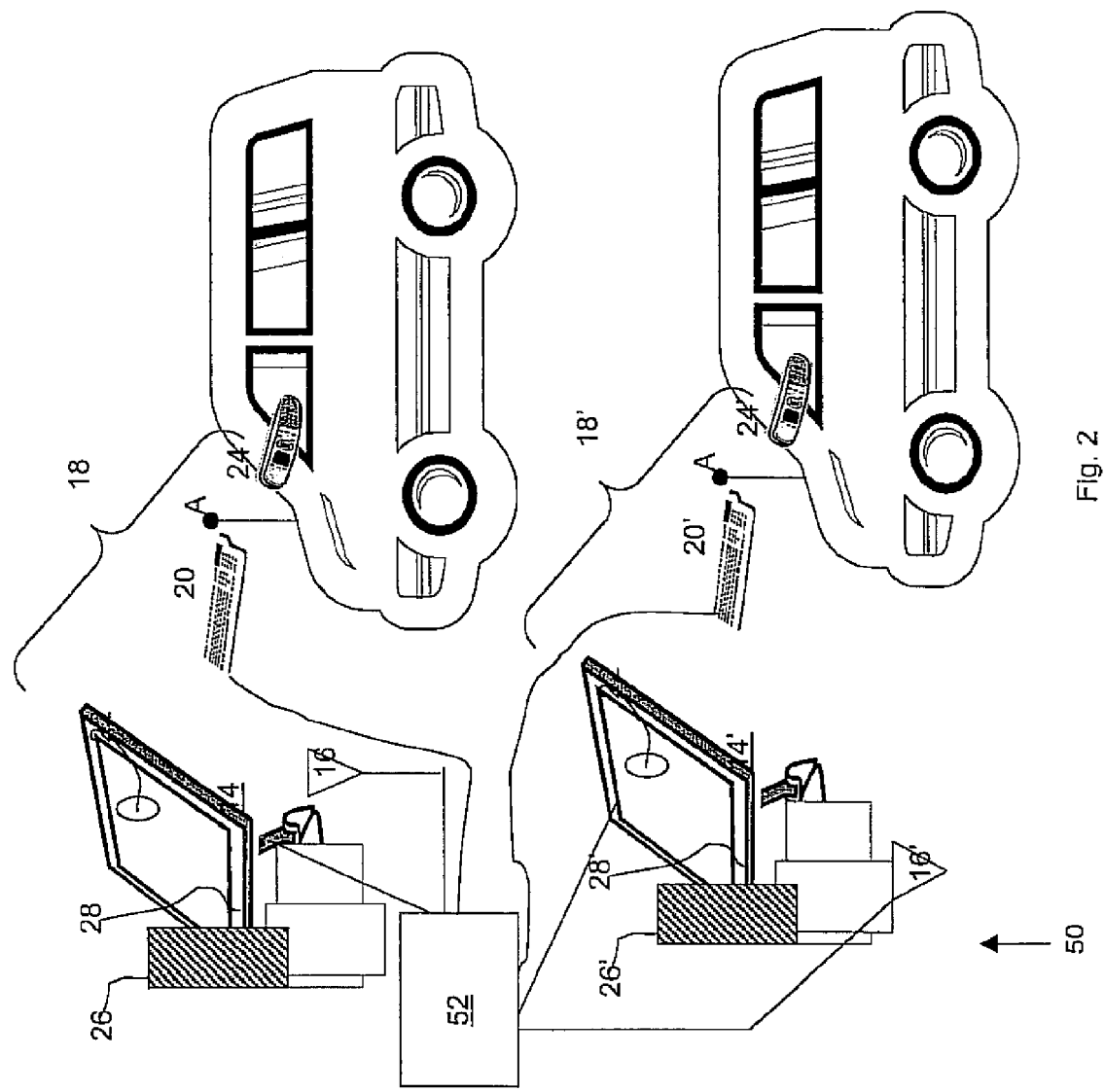
FIG. 2 is a schematic illustration of components used to practice the audio-visual system simultaneously with multiple vehicles.

Referring now to FIG. 2, where like numerals correspond to the description of those numerals with respect to FIG. 1, a multiple presentation system is shown generally at 50. The system 50 includes multiple displays 14 and 14' and multiple antennas 16 and 16'. A centralized controller 52 provides for independent presentation delivery via display 14—antenna 16 relative to display 14'—antenna 16'. Optionally, each of the multiple displays 14, 14' is provided with a user interface 18 to allow a vehicle occupant control over the presentation provided by way of the visual display 14 and the audio portion via radio frequency broadcast antenna 16. The user interface 18 is illustratively a keypad 20, a touch screen 22 incorporated into the display 14, or an infrared signal remote control 24 as is conventional to operate a television. Each of these user interfaces 18 is shown in FIG. 1, even though it is appreciated that an actual system 10 typically does not incorporate all three types of interface. The controller 52 activates a presentation directed at a vehicle occupant in any one of a number of play modes. Illustrative play modes for a controller 52 illustratively include continuous loop, start and stop, and play mode selected through a user interface 18. The interface 18 is operated by the vehicle occupant and/or the provider of a given good or service. In a preferred embodiment, a technician servicing a vehicle is provided with a microphone 19 preferably mounted within a headset 21 operative to interrupt the audio portion of only a particular vehicle being serviced. A vehicle occupant is able to respond to technician communications verbally, or via user interface 18, or via a remote control 24, or through a microphone 29 provided to the vehicle occupant for such a purpose. In the instance where the vehicle occupant has a microphone 29, the technician is equipped with a complementary speaker 31 in the headset. In this way, service is expedited in concert with a vehicle occupant receiving a presentation relevant to vehicle service products and services.

Figure 3:
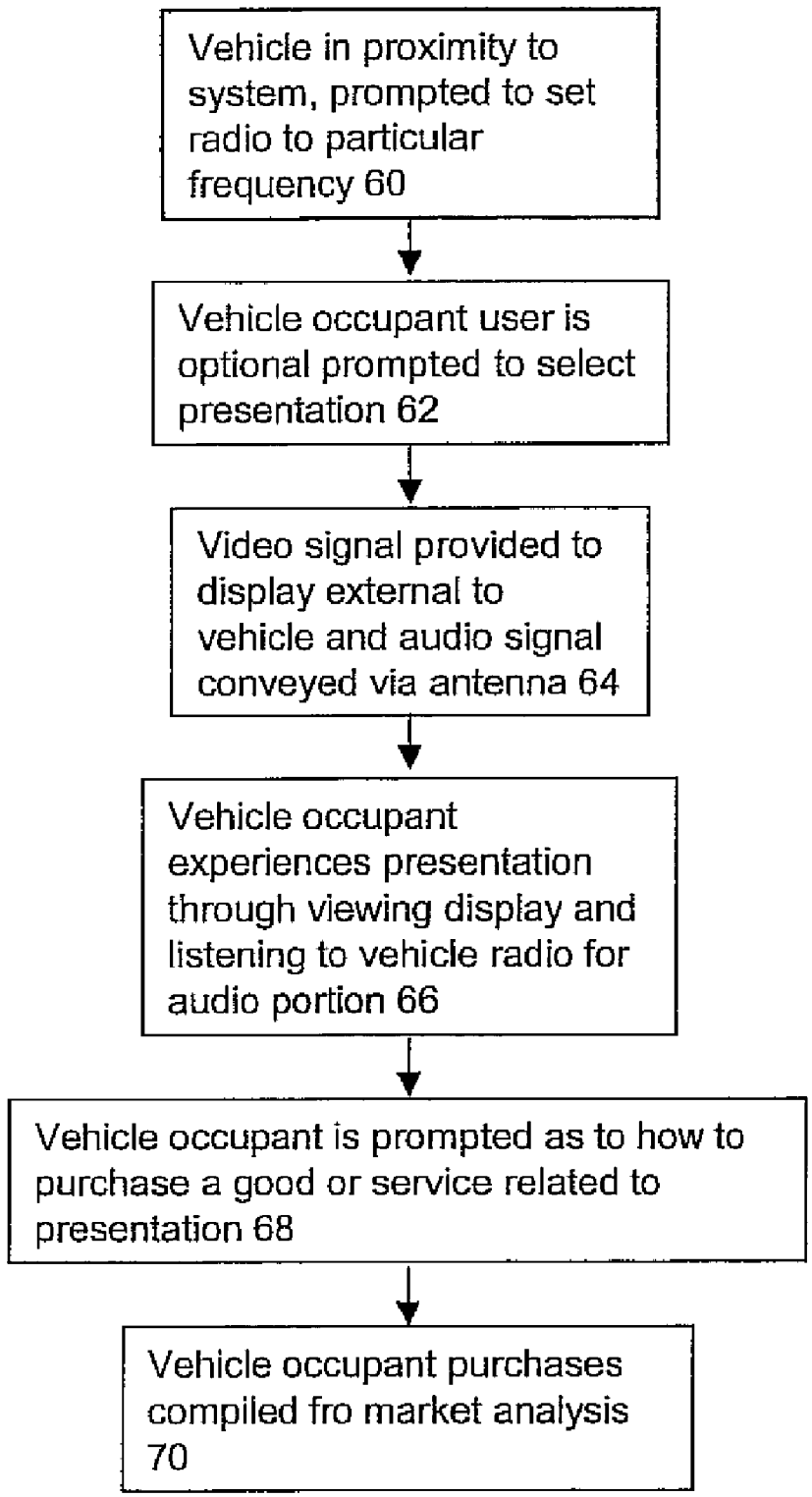
FIG. 3 is a schematic block diagram of practicing an inventive method.

Referring now to FIG. 3, an inventive point-of-sales methodology is disclosed in the form of a schematic diagram. A vehicle drives into proximity to a display and is prompted by audio, written or some other form of communication to set the vehicle radio to a particular radio frequency 60. It is appreciated that additional instructions as to the use of the system are provided through the vehicle radio playing through the vehicle sound system. In the event the inventive system embodiment includes a user interface, the user is prompted to select a presentation title, start a presentation, or enter information illustratively including answers to a battery of questions that a control algorithm then evaluates to propose a presentation to a vehicle occupant 62. In response to a presentation activation command, whether automatic or provided via user input, a video input signal is provided to a display and a corresponding audio signal is conveyed via an antenna from the controller 64. The signal originates from storage media internal to the controller or streams from a network source remote from the controller while being monitored by a central processing unit (CPU). If a vehicle radio station is tuned to receive a radio frequency signal emanating from the system antenna, a vehicle occupant experiences the audio-visual presentation through observing the display and listening to the audio portion broadcast via the vehicle radio 66. It is appreciated that the inventive methodology is not only practiced within the confines of a building housing a business, rather with reliance on an integrated active signage system (IASS) operating in a billboard or drive-through placard, the present invention is readily practiced in locales illustratively including drive-through businesses; event venues such as amphitheaters; and amusement park and sports venue parking facilities. The vehicle occupant is optionally prompted during or after the presentation as to how to purchase the product or service that is the subject of the presentation 68. Possible modes of indicating a desire to purchase a good or service illustratively include information entry via a user interface, if present; verbal communication to an establishment service provider; and completion of a written or digital order form.

Optionally, vehicle occupant purchases are compiled for marketing analysis 70. Marketing analysis derived from this analysis illustratively includes presentation effectiveness, assembly of a customer profile for targeted offers, and storage of customer data for periodic service reminders. Vehicle occupant preferences or vehicle information are also optionally noted such that upon a return visit, the customer preferences are weighed in providing presentation materials likely to be of interest to the specific customer based on customer history. It is appreciated vehicle service information and/or customer preference data is associated with a vehicle identification number (VIN), vehicle license number, or a radio frequency identification (RFID) tag, associated with the vehicle or an occupant credit, debit or identification card. Vehicle VIN or license plate information is collected through a variety of conventional techniques such as manual keying, barcode scanning, or optical scan with alphanumeric recognition capabilities to provide a vehicle coding source. Preferably, a passive RFID tag is provided and read by a radio frequency active transponder within, or in proximity to the service center. A barcode scanner and, in particular, a cordless barcode scanner provides an alternative mode of reading VIN information relative to manual keying of such information. In the event that customer information is read from a VIN, license plate, RFID, or satellite uplink, black box, or ONSTAR system prior to a customer ordering a good or service, a special sale offer is optionally customized and presented to the customer.

Figure 4:
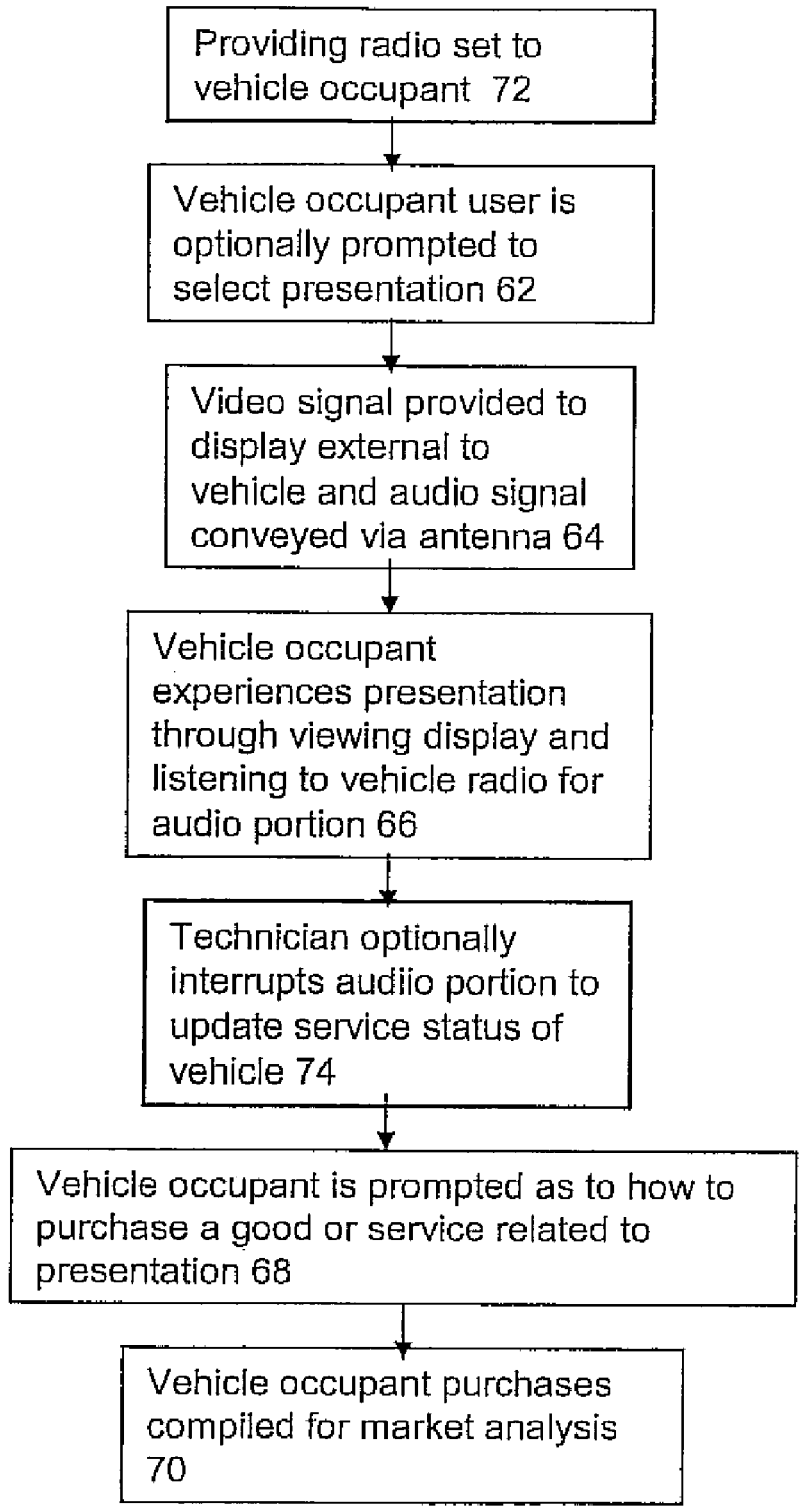
FIG. 4 is a schematic block diagram of practicing an alternative inventive method.

In another inventive embodiment of the present invention, a radio set is provided to a vehicle occupant in lieu of the use of the vehicle radio. With reference to FIG. 4, the radio set 72 is provided to the vehicle occupant. The radio set is appreciated to be of a variety of forms illustratively including a handheld radio with an optional temporary securement fixture for securing to a vehicle portion during usage, a headset, or other form of conventional transducer speaker. The remainder of process steps performed according to FIG. 4 correspond to process steps 62-70 as detailed with respect to FIG. 3 with the additional optional step of a technician equipped with a microphone interrupting the audio portion of the presentation to provide vehicle service information 74. In one particularly preferred embodiment of the present invention, a speaker is provided within the vehicle in a side-mounted screen mounted to the vehicle exterior. Specifically, a DVD or other comparable audio-visual digital presentation format player is secured to a vehicle at an exterior place therein to provide a vehicle occupant with the option to experience an audio-visual presentation.

In an alternative embodiment, the audio-visual presentation is transmitted to a vehicle occupant with a laptop computer, cell phone, IPOD or personal digital assistant (PDA). Communicating via existing wireless communication networks such as WIFI supports the ability to transmit only a portion of a presentation, or a complete audio-visual presentation to a vehicle occupant. Additionally, the use of an existing wireless network also is well suited for interruption of the presentation audio portion by a technician servicing the vehicle, as well as serving as a user interface.

An audio-video presentation system delivering a presentation to a vehicle passenger compartment includes a video display and a controller having an antenna to provide an audio output via a wireless network to a wireless receiver located within a vehicle passenger compartment. The controller is able to receive prompts from the wireless receiver in response to the presentation. It is appreciated that when the wireless receiver has integrated therewith a video display, both the audio and visual signals are readily transmitted and displayed by the wireless receiver. The wireless receiver is highly mobile, and it is appreciated that an inventive presentation is provided to a vehicle occupant while within the vehicle passenger compartment or alternatively while the vehicle occupant waits for vehicle service within a waiting room. A service technician having a microphone is preferably able to interrupt the audio signal to provide servicing information regarding vehicle service and to solicit vehicle maintenance instructions. A user receiving a presentation on a wireless receiver is capable of providing vehicle maintenance instructions to the technician orally, or via keypad, or touch screen entry.

In a waiting room setting, in which a vehicle occupant awaits while their vehicle is being serviced, an audio-visual display is located within the waiting room. A controller provides a video signal and an audio signal to the display, the audio-visual display typically being wall mounted or free-standing on the floor or within a cabinet. A technician having a microphone operative to interrupt the audio signal of the presentation provides a viewer with updates as to the service of their vehicle and directs them to provide instructions as to additional maintenance procedures based on the technician's findings. Multiple technicians simultaneously servicing multiple vehicle service bays each provided with a microphone are able to gain the attention of individuals so as to provide service updates and seek maintenance instructions.

Figure 5:
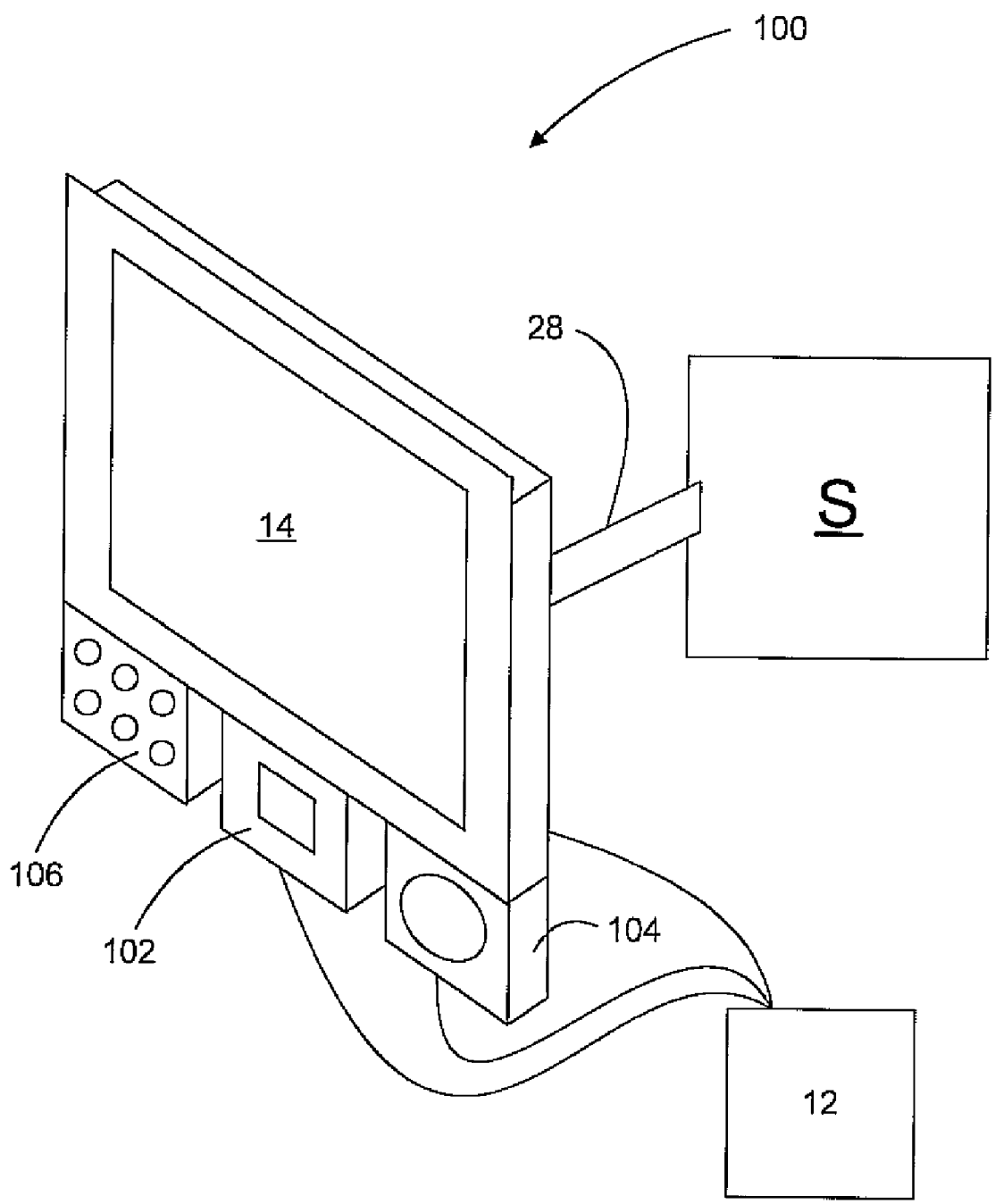
FIG. 5 is a schematic illustration of components of an inventive kiork.

In a business setting remote from a vehicle, an inventive kiosk depicted generally at 100 in FIG. 5 is provided where like numerals correspond to those detailed with respect to the aforementioned figures. Scanner 102 reading a barcode or RFID tag associated with a product is provided and coupled to a controller 12. With the scanning of product information, product information such as price, manufacturer or the like is provided on a visual display 14. The display 14 also provides a prompt as to whether a potential customer would like to experience an audio-visual presentation related to the product. The subject of such presentation illustratively includes manufacturing method, product usage, product benefits or the like. A controller 12 feeds audio-visual content to the display 14 and a speaker 104. Presentation materials are stored within the controller 12 or alternatively accessed through the Internet. The display 14 is fixtured to a substrate S by way of an arm 28. Optionally, a keypad 106 is provided to allow for customer input. Optionally, a potential customer is provided with the ability to email information relating to the product scan or the audio-visual presentation to an email address. By way of example, a potential customer in a grocery store approaches an inventive kiosk 100 and scans a barcode associated with a loaf of bread. In response to the scan the potential customer is offered the option to watch an audio-visual presentation with respect to how the loaf of bread is manufactured, nutritional information or the like. During or after the presentation, the potential customer is given the option to email information to an address. Alternatively, the potential customer scans a second loaf of bread and is thereafter prompted if a side-by-side comparison as to nutritional value is desired on the display 14, and whether it is desired to email the displayed information to an address.

One skilled in the art should appreciate from the inventive description that the broad teachings of the present invention are readily implemented in a variety of forms and venues. It should be appreciated that while the present invention has been described with respect to particular examples, other modifications will become apparent to one of skill in the art upon consideration of the instant specification. Such modifications are intended to be included within the scope of the present invention.

The invention claimed is:

1. An audio-visual point of sale presentation system delivering a presentation to a vehicle passenger compartment comprising:
   a video display mounted external to a vehicle passenger compartment and viewable therefrom at a point of sale and playing a video input signal of the point-of-sale presentation;
   a controller providing the video signal to said display and a corresponding audio signal; and
   an antenna coupled to said controller broadcasting the audio signal as an amplitude modulation or frequency modulation radio frequency representing the audio signal of the presentation, the radio frequency audio signal received by an existing vehicle radio tuned to receive the radio frequency audio signal and discernable through a vehicle sound system to deliver the presentation to the vehicle passenger compartment wherein the controller recalls information about a vehicle or a vehicle occupant wherein upon subsequent return of the vehicle or the vehicle occupant to the point-of-sale to provide a subsequent presentation based on a customer history.

2. The system of claim 1 wherein the radio frequency carrying the audio signal is an amplitude modulation waveform.

3. The system of claim 1 further comprising a user interface.

4. The system of claim 1 wherein said user interface is a remote infrared controller.

5. The system of claim 1 wherein said user interface is a keypad.

6. The system of claim 1 wherein said user interface is a touch screen within said display.

7. The system of claim 1 further comprising a repositionable arm from which said display extends.

8. The system of claim 1 further comprising a network connection for loading a digital file to said controller, said file containing a controller readable format of the presentation.

9. The system of claim 1 further comprising a second display and a second antenna, said second display and said second antenna operable independent of said video display and said antenna wherein said controller provides the video signal to said second display and the audio signal to the second antenna.

10. The system of claim 1 further comprising a technician microphone operative to interrupt the radio frequency.

11. The system of claim 1 further comprising a scanner or radio frequency reader external to the vehicle passenger compartment operative to read a vehicle-unique code.

12. A method of a point-of sale presentation for purchase of a good or service at a vehicle comprising:
   providing a sales presentation through a visual display external to a vehicle passenger compartment at a point of sale and playing a video input signal of the point-of-sale presentation, the visual display being viewable from the vehicle passenger compartment;
   transmitting a radio frequency audio signal at a predetermined frequency in concert with the visual display;
   playing said radio frequency audio signal through an existing vehicle radio tuned to receive the radio frequency in concert with the visual display to induce the purchase of the good or the service; and
   providing a vehicle occupant with an opportunity for the purchase of the good or the service associated with the sales presentation; and recalling information about the vehicle or a vehicle occupant upon subsequent return of the vehicle or the vehicle occupant to the point-of-sale to provide a subsequent sales presentation based on customer history.

13. The method of claim 12 further comprising allowing the vehicle occupant to select said presentation.

14. The method of any claim 12 further comprising querying the vehicle occupant to provide information.

15. The method of claim 12 wherein the vehicle occupant enters responses to the querying step through a user interface in electronic communication with said visual display.

16. The method of claim 12 further comprising conducting marketing analysis based on purchasing said good or service relative to said presentation.

17. The method of claim 12 further comprising storing information about a vehicle or the vehicle occupant.

18. The method of claim 17 wherein vehicle information is collected from a source selected from the group consisting of: a barcode, license plate number, vehicle identification number, and radio frequency identification tag.

19. The method of claim 12 wherein said visual display is an integrated active signage system operative as a billboard or drive-through placard.

20. An audio-video presentation system delivering a point-of-sale presentation to a vehicle passenger compartment comprising:
   a video display mounted external to a vehicle passenger compartment and viewable therefrom at a point of sale and playing a video input signal of the point-of-sale presentation;
   a controller providing the video signal to said display and a corresponding audio signal; and
   an antenna coupled to said controller broadcasting the audio signal as an amplitude modulation or frequency audio signal modulation radio frequency representing the audio signal of the presentation, the radio frequency audio signal received by a portable radio set placed within the vehicle passenger compartment tuned to receive the radio frequency audio signal to deliver the presentation to the vehicle passenger compartment wherein upon subsequent return of the vehicle or the vehicle occupant to the point-of-sale to provide a subsequent presentation based on a customer history.

21. The system of claim 20 wherein said radio set is selected from the group consisting of: a handheld radio and a headset.

22. The system of claim 20 further comprising a user interface.

23. The system of claim 20 further comprising a technician microphone operative to interrupt the radio frequency audio signal.

* * * * *